United States Patent
Hosoda

(10) Patent No.: US 12,470,662 B2
(45) Date of Patent: Nov. 11, 2025

(54) INFORMATION PROCESSING APPARATUS INCLUDING PATTERN AUTHENTICATION FUNCTION AND CONTROL METHOD

(71) Applicant: CANON KABUSHIKI KAISHA, Tokyo (JP)

(72) Inventor: Yasuhiro Hosoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/047,537

(22) Filed: Oct. 18, 2022

(65) Prior Publication Data
US 2023/0127491 A1 Apr. 27, 2023

(30) Foreign Application Priority Data
Oct. 21, 2021 (JP) .................................. 2021-172316

(51) Int. Cl.
H04N 1/00 (2006.01)
G06F 3/0488 (2022.01)

(52) U.S. Cl.
CPC ....... *H04N 1/00854* (2013.01); *G06F 3/0488* (2013.01); *H04N 1/00413* (2013.01); *H04N 1/00514* (2013.01)

(58) Field of Classification Search
CPC ........ G06F 21/36; G06F 3/041; G06F 3/0412; G06F 3/04883; G06F 3/04886; G06F 21/31; G06F 2203/04101; G06F 2203/04104; G06F 2203/04803; G06F 2203/04808; G06V 10/469; G06V 40/28
See application file for complete search history.

(56) References Cited

U.S. PATENT DOCUMENTS

| | | | | |
|---|---|---|---|---|
| 8,504,842 | B1 * | 8/2013 | Meacham ............... | G06F 21/36 726/16 |
| 8,847,903 | B2 * | 9/2014 | Stokes .............. | H04M 1/72469 345/173 |
| 8,904,479 | B1 * | 12/2014 | Johansson ............... | G06F 21/36 382/181 |
| 9,710,639 | B1 * | 7/2017 | Saini ....................... | G06F 21/36 |
| 9,733,752 | B2 * | 8/2017 | Park ........................ | G06F 21/36 |

(Continued)

FOREIGN PATENT DOCUMENTS

| | | |
|---|---|---|
| JP | 2009076070 A | 4/2009 |
| JP | 2011232898 A | 11/2011 |
| JP | 2016170721 A | 9/2016 |

*Primary Examiner* — Kenny Nguyen
(74) *Attorney, Agent, or Firm* — Canon U.S.A., Inc. IP Divsion

(57) ABSTRACT

An information processing apparatus including an operation panel, the information processing apparatus includes a display control unit configured to display, on the operation panel, a plurality of first display objects to receive authentication information, and a reception unit configured to receive the authentication information, based on first display objects selected from among the plurality of first display objects by an operation of an indicator that touches on the operation panel and moves while maintaining the touching state on the operation panel, wherein, in a case where the display control unit receives the operation, the display control unit performs display indicating receipt of the operation without performing display indicating selection performed on the plurality of first display objects.

19 Claims, 12 Drawing Sheets

(56) References Cited

U.S. PATENT DOCUMENTS

| | | | |
|---|---|---|---|
| 9,940,407 B2* | 4/2018 | Na | G06F 21/36 |
| 10,007,777 B1* | 6/2018 | Saini | G06F 21/36 |
| 10,013,546 B1* | 7/2018 | Johansson | G06F 21/36 |
| 10,181,017 B2* | 1/2019 | Clarke | G06F 3/038 |
| 10,198,568 B2 | 2/2019 | Hwang | G06F 3/0482 |
| 10,270,941 B2* | 4/2019 | Asakimori | B41J 29/38 |
| 10,445,485 B2* | 10/2019 | Lee | G06F 3/04842 |
| 10,530,762 B2* | 1/2020 | Green | G06F 21/41 |
| 10,558,355 B2* | 2/2020 | Bean | G06F 3/04883 |
| 10,585,519 B2* | 3/2020 | Akiyoshi | G06F 21/32 |
| 10,762,493 B2* | 9/2020 | Kim | G06F 21/36 |
| 10,764,280 B2* | 9/2020 | Kim | H04W 12/065 |
| 2005/0010768 A1* | 1/2005 | Light | G06F 21/34 713/168 |
| 2009/0289916 A1* | 11/2009 | Dai | G06F 3/04883 345/173 |
| 2011/0300831 A1* | 12/2011 | Chin | H04W 12/06 345/173 |
| 2011/0316797 A1* | 12/2011 | Johansson | G06F 3/04847 345/173 |
| 2013/0318598 A1* | 11/2013 | Meacham | G06F 21/36 726/19 |
| 2014/0366127 A1* | 12/2014 | DeLuca | G06F 21/36 726/19 |
| 2015/0006376 A1* | 1/2015 | Nuthulapati | G07F 7/0853 705/41 |
| 2015/0193553 A1* | 7/2015 | Petersen | G06F 21/00 235/375 |
| 2015/0309657 A1* | 10/2015 | Park | G06F 3/0412 345/173 |
| 2016/0065558 A1* | 3/2016 | Suresh | G06F 21/32 726/7 |
| 2016/0078207 A1* | 3/2016 | Na | G06F 21/36 726/19 |
| 2016/0260080 A1* | 9/2016 | Choi | G06Q 20/405 |
| 2016/0321444 A1* | 11/2016 | Kim | H04M 1/67 |
| 2016/0335428 A1* | 11/2016 | Hwang | G06F 3/0488 |
| 2016/0364564 A1* | 12/2016 | Lee | G06F 3/0484 |
| 2017/0063851 A1* | 3/2017 | Kim | H04W 12/065 |
| 2017/0169199 A1* | 6/2017 | Clarke | G06F 3/038 |
| 2017/0177851 A1* | 6/2017 | Sawant | G06F 21/36 |
| 2017/0255772 A1* | 9/2017 | Hu | G06F 21/36 |
| 2017/0264605 A1* | 9/2017 | Green | G06F 21/41 |
| 2017/0300159 A1* | 10/2017 | Akiyoshi | G06F 3/04886 |
| 2017/0318189 A1* | 11/2017 | Asakimori | H04N 1/00392 |
| 2018/0239882 A1* | 8/2018 | Bean | G06F 3/04886 |
| 2018/0247295 A1* | 8/2018 | Kim | H04M 1/673 |
| 2018/0373901 A1* | 12/2018 | Wang | G06F 3/0488 |
| 2019/0294776 A1* | 9/2019 | Lin | G06F 3/04817 |
| 2020/0125714 A1* | 4/2020 | Kubota | G06F 21/45 |
| 2020/0193001 A1* | 6/2020 | Qin | G06F 3/0482 |
| 2020/0233619 A1* | 7/2020 | Hosoda | G06F 3/1209 |
| 2023/0291724 A1* | 9/2023 | Quek | H04L 9/3213 |

* cited by examiner

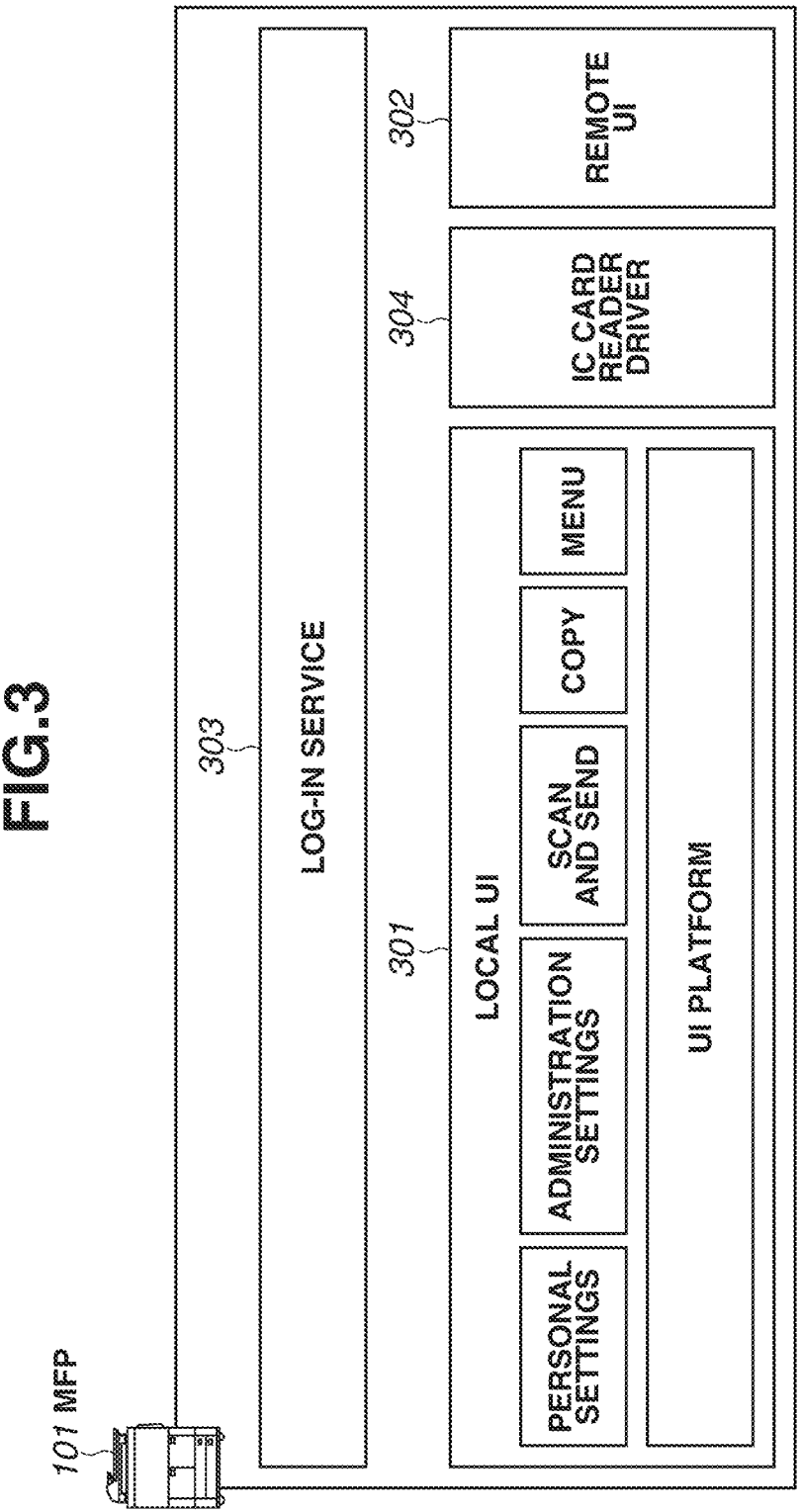

FIG.4

USER AUTHENTICATION SETTINGS

LOG-IN METHOD IN LOCAL UI

- ☑ KEYBOARD AUTHENTICATION
- ☑ SIMPLE LOG-IN
  - ☐ FORCE USAGE OF PATTERN AUTHENTICATION
- ☐ IC CARD AUTHENTICATION
  - ☐ FORCE USAGE OF PATTERN AUTHENTICATION (TWO FACTOR AUTHENTICATION)

METHOD OF DISPLAYING LOG-IN SCREEN

- ◉ AT TIME OF START OF OPERATION OF MFP
- ◉ AT TIME OF SELECTION OF FUNCTION
  - ☐ COPY
  - ☐ SCAN
  - ☑ PERSONAL SETTINGS
  - ☑ ADMINISTRATION SETTINGS

[REGISTER] [EDIT] [DELETE]

| | USER NAME | ROLE | E-MAIL |
|---|---|---|---|
| ☐ | Admin | Administrator | admin@xxxxx.com |
| ☐ | Alice | Administrator | alice@xxxxx.com |
| ☐ | Bob | GeneralUser | bob@xxxxx.com |
| ☐ | Carol | GeneralUser | carol@xxxxx.com |
| ☐ | Dave | LimitedUser | dave@xxxxx.com |

FIG.5

EDIT USER

USER NAME: Alice

PASSWORD: [ ******** ]

CARD ID: [ 44E7158E... ]

PATTERN REGISTRATION STATUS: REGISTERED  [ DELETE REGISTRATION ]

ICON: BALL  [ SELECT ]

ROLE: [ Administrator ▽ ]

E-MAIL ADDRESS: [ alice@xxxxx.com ]

INFORMATION PROCESSING APPARATUS INCLUDING PATTERN AUTHENTICATION FUNCTION AND CONTROL METHOD

BACKGROUND

Field of the Disclosure

The present disclosure relates to an information processing apparatus including a pattern authentication function, and a control method for the information processing apparatus.

Description of the Related Art

Recent years have seen a wide variety of authentication methods for apparatuses, such as a multifunction peripheral and a mobile terminal. Among the authentication methods is a pattern authentication in which a graphic pattern (trajectory) which has been drawn with a user's finger by tracing objects displayed on a touch panel is compared with a preliminarily registered pattern and determination of whether the graphic pattern and the registered pattern is matched with each other is performed. In many cases at the time of authentication in personal use apparatuses, such as a mobile terminal, a trajectory of a user's finger is displayed or appearances of the traced objects are changed, to help the user visually recognize his/her operation. Meanwhile, if a trajectory of a user's finger or the like is displayed on an apparatus, such as a multifunction peripheral, which is shared by a plurality of users, there is a possibility that confidentiality cannot be guaranteed due to a risk of shoulder surfing by a third person. To address the issue, Japanese Patent Application Laid-Open No. 2016-170721 discusses a method of displaying a part of a tracing trajectory of a user's finger instead of displaying the whole of the trajectory.

Even if a part of a trajectory is displayed as discussed in Japanese Patent Application Laid-Open No. 2016-170721, a third person is still able to guess a pattern or the like by secretly observing a user operation. On the other hand, if display of an operation panel is not changed at all by a user's operation, the user who performs the operation cannot check his/her own operation, which results in a decrease in operability.

SUMMARY

Embodiments of the present disclosure are directed to providing an authentication information entry method that guarantees confidentiality without decreasing operability of a user.

According to embodiments of the present disclosure, an information processing apparatus including an operation panel, the information processing apparatus includes a display control unit configured to display, on the operation panel, a plurality of first display objects to receive authentication information, and a reception unit configured to receive the authentication information, based on first display objects selected from among the plurality of first display objects by an operation of an indicator that touches on the operation panel and moves while maintaining the touching state on the operation panel, wherein, in a case where the display control unit receives the operation, the display control unit performs display indicating receipt of the operation without performing display indicating selection performed on the plurality of first display objects.

Further features of the present disclosure will become apparent from the following description of exemplary embodiments with reference to the attached drawings.

BRIEF DESCRIPTION OF THE DRAWINGS

FIG. 3 is a diagram illustrating a software configuration of the MFP.
FIG. 4 is a diagram illustrating a screen for user authentication settings.
FIG. 5 is a diagram illustrating a screen for editing user account information.

BRIEF DESCRIPTION OF THE EMBODIMENTS

Modes for implementing embodiments of the present disclosure will be described below with reference to the accompanying drawings. Exemplary embodiments of the present disclosure will be described using a multifunction peripheral (MFP) provided with functions of copying, printing, scanning, and the like, as an example of an information processing apparatus to which embodiments of the present disclosure are applied. However, the information processing apparatus is not limited to the MFP, and may be a mobile terminal, a personal computer (PC), or the like.

<System Configuration>

Figure 1:
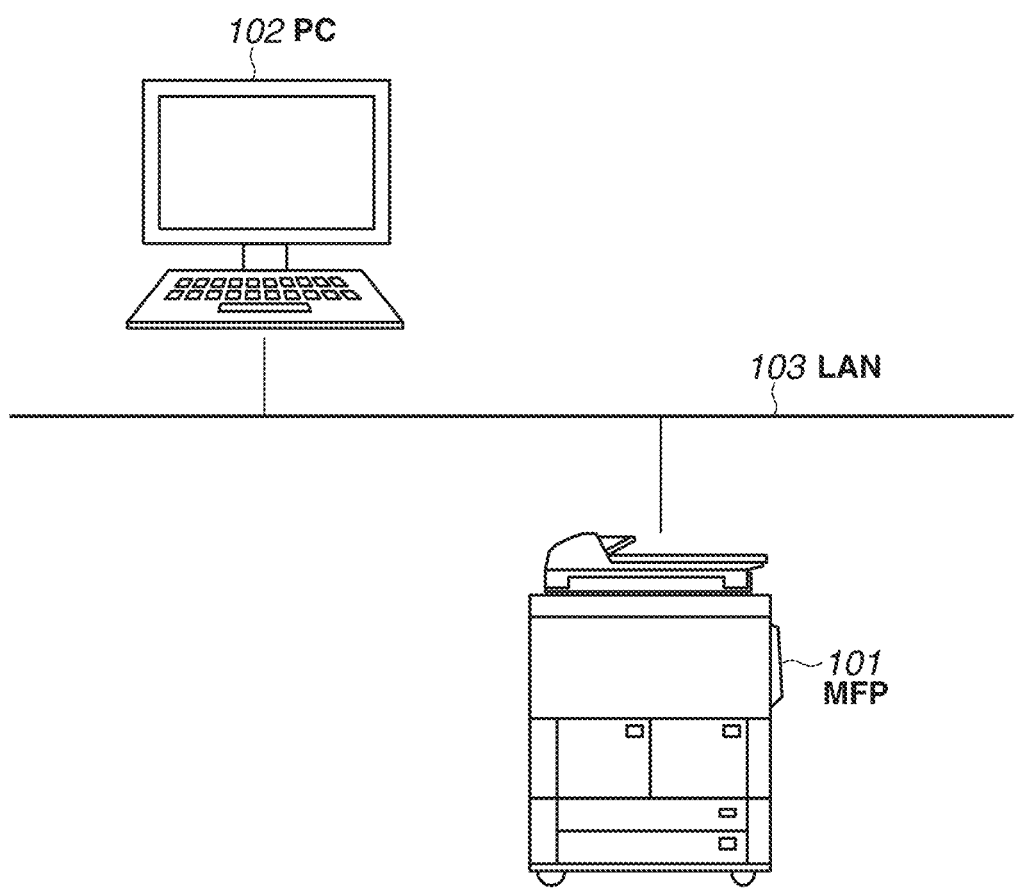
FIG. 1 is a diagram illustrating a system configuration.

A system configuration according to a first exemplary embodiment will be described with reference to FIG. 1. An MFP 101 is an MFP to which embodiments of the present disclosure are applied. The MFP 101 is connected to a local area network (LAN) 103. The MFP 101 is capable of receiving a print job or the like from a terminal (for example, a PC 102) that is connected to the LAN 103.

Aside from the apparatuses mentioned herein, an apparatus, such as an authenticating server, may be connected to the LAN 103.

<Hardware Configuration>

Figure 2:
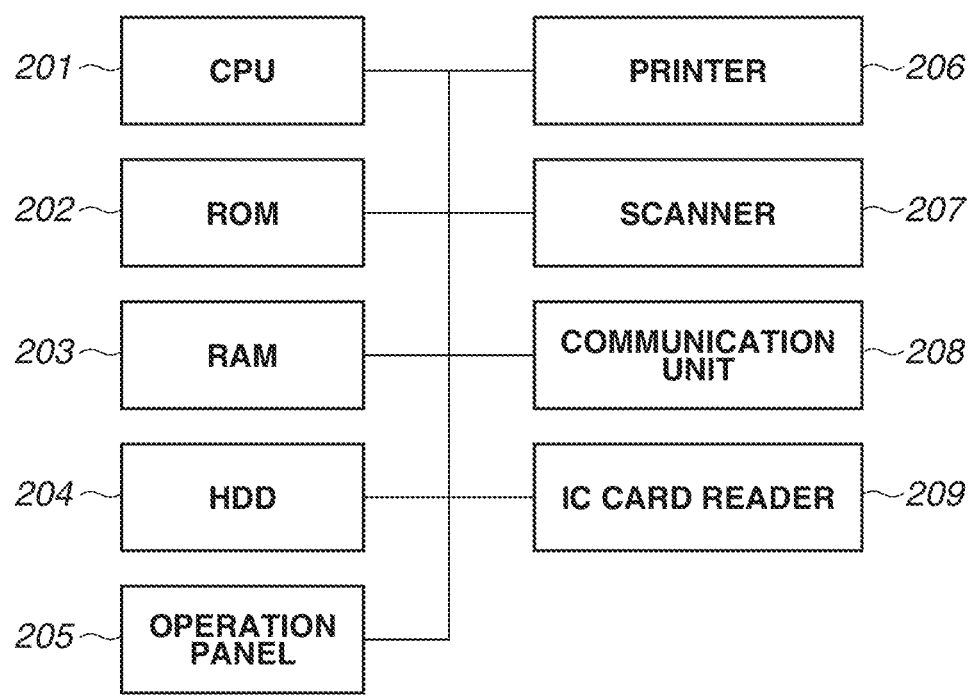
FIG. 2 is a diagram illustrating a hardware configuration of a multifunction peripheral (MFP).

FIG. 2 is a simplified diagram illustrating a hardware configuration of the MFP 101.

A central processing unit (CPU) 201 is a central processing device (processor) that controls whole operation of the MFP 101.

A random-access memory (RAM) 203 is a volatile memory serving as a work area, and is used as a temporary storage area for loading various kinds of programs stored in a read-only memory (ROM) 202 and a hard disk drive (HDD) 204.

The ROM 202 is a non-volatile memory, and stores therein a boot program and the like of the MFP 101. The HDD 204 is a non-volatile hard disk with higher capacity than the capacity of the RAM 203. A control program for an MFP 101 is stored in the HDD 204. An operating system (OS) and an application program are also stored in the HDD 204.

The CPU 201 executes the boot program stored in the ROM 202 at the time of start-up of the MFP 101. The boot program is a program for reading out a program of the OS stored in the HDD 204, and loading the program into the RAM 203. The CPU 201, after executing the boot program, subsequently executes the program of the OS loaded into the RAM 203, and performs control of the MFP 101. The CPU 201 stores, in the RAM 203, data that is used for operations based on the control program, and performs reading and writing.

In the MFP 101, one CPU 201 executes each processing described in a flowchart, which will be described below, but another mode can be employed. For example, a plurality of CPUs and a plurality of microprocessing units (MPUs) can also be configured to execute, in cooperation, each processing described in the flowchart, which will be described below. Part of the processing, which will be described below, can also be executed by a hardware circuit, such as an application-specific integrated circuit (ASIC) and a field-programmable gate array (FPGA) circuit.

An operation panel 205 is a display (touch panel) that can receive a touch operation. The operation panel 205 displays various kinds of information and accepts a user operation.

A printer 206 is a printer engine that prints print data that is received from the outside via a communication unit 208 and digital data that is acquired from a scanner 207. The scanner 207 is a scanner device that reads a paper document and digitizes the read paper document into data.

The communication unit 208 is a network interface for connection with the Internet or an office LAN.

An integrated circuit (IC) card reader 209 is a device for reading out information to be used for user authentication or other information from an IC card, and is a unit for implementing IC card authentication. While the present exemplary embodiment is described using the multifunction peripheral (MFP 101) having a printer function and a scanner function as an example, an apparatus in the present exemplary embodiment can be any information processing apparatus having an operation panel capable of accepting entry of a pattern, and is not limited to the MFP.

<Software Configuration>

FIG. 3 is a simplified diagram illustrating a software configuration of the MFP 101.

A local user interface (UI) 301 of the MFP 101 provides a user interface that is displayed on a display of the operation panel 205. The local UI 301 includes a menu screen on which a user selects a function, an application screen, and a UI platform in charge of controlling screen transition. Examples of the application screen include a screen for a copy application that controls the printer 206 and the scanner 207 to provide a copy function to the user, and a screen for an application that controls the scanner 207 and the communication unit 208 to provide a function of transmitting a scanned document. The local UI 301 controls the above-described screens.

A remote UI 302 has a Hypertext Transfer Protocol (HTTP) server function, and provides a user remotely accessing the MFP 101 with a user interface configured with a HyperText Markup Language (HTML). The user accesses the remote UI 302 using a web browser of a PC terminal, and can change settings of the MFP 101 and use a function of the MFP 101 on a screen displayed on the web browser.

A log-in service 303 is a software module for authenticating the user who uses the local UI 301 or the remote UI 302. The log-in service 303 manages user information and the like of the MFP 101, authenticates the user, and performs log-in processing.

An IC card reader driver 304 is a driver that controls the IC card reader 209, acquires information from the IC card, and provides the log-in service 303 with the IC card information.

<User Account>

A user account managed by the log-in service 303 is now described. The log-in service 303 stores and manages the user account in a user account table as shown in Table 1. The user account table (Table 1) is a database stored in the HDD 204. A database in another node on a network can be used on the condition that a communication path and a storage are encrypted and tamperproof measures are taken. The user account table holds a user name, a password, a card identification (ID) to be used for IC card authentication, a pattern, a role, an e-mail address, and the like in a manner associated with each other. Information of each user is recorded in each row.

TABLE 1

| User name | Password | Card ID | Pattern | Role | E-mail |
|---|---|---|---|---|---|
| Admin | ******** | F1EABB15 . . . | 479960 | Administrator | admin@xxxxx.com |
| Alice | ******** | 44E7158E . . . | 922524 | Administrator | alice@xxxxx.com |
| Bob | ******** | 045BB438 . . . | | GeneralUser | bob@xxxxx.com |
| Carol | ******** | 19E313B6 . . . | | GeneralUser | carol@xxxxx.com |
| Dave | ******** | BDFDB85 . . . | | LimitedUser | dave@xxxxx.com |

"User name" is identification information for identifying a user. "Password" is entered when user authentication is performed with identification information and a password of the user. "Card ID" is an identifier of the ID card to be used for log-in with the ID card. "Pattern" is authentication information for pattern authentication, which will be described below. Authentication that is performed by the user tracing a display object displayed on the operation panel 205 with a finger is referred to as pattern authentication, and a plurality of display objects that is selected by the tracing with the finger and the order of the object selection are referred to as a pattern. "Role" is information indicating the user's usage authority with respect to the MFP 101. An example of each role and usage authority is indicated in a role information table (Table 2). In addition to definition of roles provided as a factory default of the MFP 101, the user may also set detailed usage authority to create a new role.

TABLE 2

| Role | Authority |
|---|---|
| Administrator | Permitted to change settings, permitted to use color print, permitted to edit address book |

TABLE 2-continued

| Role | Authority |
| --- | --- |
| GeneralUser | Not permitted to change settings, permitted to use color print, permitted to refer to address book |
| LimitedUser | Not permitted to change settings, prohibited from using color print, prohibited from referring to address book |

<User Authentication Function>

Subsequently, a user authentication function included in the MFP 101 is described with reference to FIGS. 4, 5, and 6.

FIG. 4 illustrates an example of a UI, which is provided by the remote UI 302, for user authentication settings of the MFP 101. A similar UI can also be provided to an administrator by the local UI 301, other than by the remote UI 302.

A screen 401 is a screen of the remote UI 302 on which user authentication settings are made. A user with an administrator role can access the screen. Although not illustrated, the log-in service 303 displays a log-in screen created with the HTML to the user who accesses the remote UI 302. On the log-in screen for accessing the remote UI 302, the user is authenticated upon acceptance of the user name and the password, and whether or not the user has the usage authority with respect to the remote UI 302 is checked with reference to Table 1.

An item 402 is an example of an item for setting a log-in method in the local UI 301. As the log-in method, one or more log-in methods can be selected from "KEYBOARD AUTHENTICATION", "SIMPLE LOG-IN", and "IC CARD AUTHENTICATION". Each log-in method is now described.

<Keyboard Authentication>

The keyboard authentication provides a method of causing the user to enter the user name and the password on the log-in screen, which receives entry for log-in, using a keyboard to log in to the MFP 101. FIG. 6 illustrates a log-in screen 602 as an example of a log-in screen for the keyboard authentication. The entry is performed using hardware keys of the MFP 101, or software keys, which are not illustrated.

<Simple Log-In>

The simple log-in displays buttons corresponding to respective registered users on the log-in screen.

An icon image serving as an avatar of the user and the user name are displayed on the respective buttons. The MFP 101 causes the user to select a button corresponding to his/her own avatar and causes the user to log in to the MFP 101. The simple log-in can be used in combination with the pattern authentication to prevent unauthorized log-in. In a case where the user sets a pattern for pattern authentication, the MFP 101 identifies the user by accepting selection of a button corresponding to the user and performs authentication of the pattern corresponding to the identified user. A setting 403 is set by the administrator to force usage of the pattern authentication at the time of usage of the simple log-in. Enabling the setting 403 can force all users to execute the pattern authentication. In a case where the administrator does not force the execution of the pattern authentication, each user can also execute the pattern authentication on a voluntary basis. Details of the pattern authentication will be described below.

Figure 6:
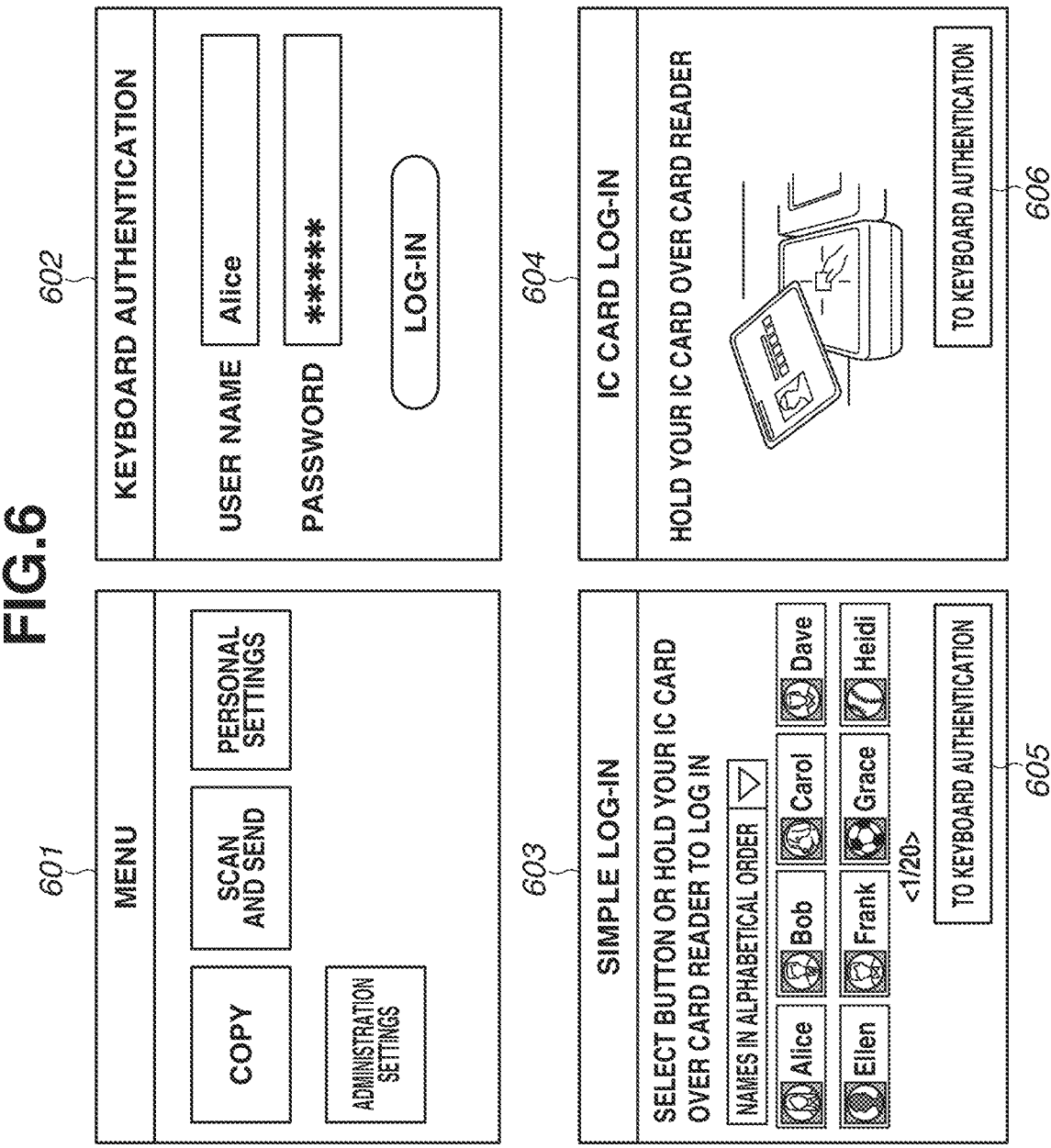
FIG. 6 is a diagram illustrating a menu and a log-in screen.

FIG. 6 illustrates a log-in screen 603 as an example of the log-in screen for the simple log-in. In a case where the keyboard authentication is enabled in addition to the simple log-in, a button 605 for displaying a screen for the keyboard authentication is displayed on the log-in screen 603 for the simple log-in. The user can switch a log-in method by pressing the button 605. In a case where the IC card authentication is enabled in addition to the simple log-in, the MFP 101 accepts the user's touch of the IC card in a state where the log-in screen 603 for the simple log-in is displayed, and identifies the user based on information acquired from the IC card held over the IC card reader 209.

<IC Card Authentication>

The user authentication is performed with the IC card. FIG. 6 illustrates a log-in screen 604 as an example of a log-in screen for IC card authentication. In the IC card authentication, the MFP 101 acquires card ID from the IC card held over the IC card reader 209, identifies the user in association with the card ID with reference to a user information table, and causes the user to log in to the MFP 101. In a case where the keyboard authentication is enabled in addition to the IC card authentication, a button 606 for displaying the screen for the keyboard authentication is displayed on the log-in screen 604 for the IC card authentication. The user can switch a log-in method by pressing the button 606. To prevent unauthorized usage of the IC card by others and forgery of the IC card, the IC card authentication can also be used in combination with the pattern authentication. In a case where the user sets the pattern authentication, the MFP 101 performs, after the IC card authentication, authentication of the pattern corresponding to the user identified from the card ID. A combination of authentication of a possession factor of the IC card and authentication of a knowledge factor of the pattern can be used as a two factor authentication function. A setting 404 is set by the administrator to force usage of the pattern authentication at the time of usage of the IC card authentication.

Enabling the setting 404 can force all users to execute the pattern authentication. In a case where the administrator does not force the execution of the pattern authentication, each user can also execute the pattern authentication on a voluntary basis. In a case where the administrator intentionally forces usage of the two factor authentication, the setting 404 is enabled to force usage of the pattern, and the "KEYBOARD AUTHENTICATION" and "SIMPLE LOG-IN", which do not correspond to the two factor authentication, are set to OFF. Details of the pattern authentication will be described below.

An item 405 is an example of an item for setting a timing of displaying the log-in screen. As the timing for displaying the log-in screen, either "AT TIME OF START OF OPERATION OF MFP" or "AT TIME OF SELECTION OF FUNCTION" can be set. In a case where "AT TIME OF SELECTION OF FUNCTION" is selected, a function that further requires log-in is selected and set. For example, as the factory default of the MFP 101, "AT TIME OF SELECTION OF FUNCTION" is selected as a default, and as functions that further require authentication, "PERSONAL SETTINGS" and "ADMINISTRATION SETTINGS" are set as defaults. These settings enable display of a menu screen 601 without user authentication at the time of start-up of the MFP 101. In a case where the user selects "PERSONAL SETTINGS" or "ADMINISTRATION SETTINGS" as the functions that further require authentication, the MFP 101 displays the log-in screens (602, 603, and 604) to authenticate the user.

In a case where "AT TIME OF START OF OPERATION OF MFP" is selected, the log-in screens (602, 603, and 604) are displayed at the time of the start-up of the MFP 101 to ask all users who use the menu screen 601 of the MFP 101 for authentication. In a case where the user performs a log-in operation on the log-in screen and the user authentication succeeds, the menu screen is displayed.

<User Management>

An item 406 is an example of an item for managing accounts of uses who use the MFP 101. The item 406 provides a function of registering a new user account and a function of selecting a registered account for editing or deletion. For example, in a case where "Admin" selects" an account of "Alice" in the item 406 and presses an edit button, the remote UI 302 displays a user edit screen illustrated in FIG. 5. On the user edit screen, the password, the card ID, the role, the e-mail address, the icon image displayed on the button for the simple log-in, and the like can be edited and saved. The user edit screen provides a function of displaying a registration status of the pattern for the administrator to grasp the registration status of the pattern of a general user. The user edit screen also provides a function of deleting the registration of the pattern in case that the general user forgets the registered pattern and asks the administrator to reset the pattern. Since an individual pattern is registered by each general user himself/herself in the local UI 301, a function that is used by the administrator to register patterns of others is not provided.

<Pattern Registration Method>

Subsequently, an example of a method of registering the pattern used for authentication is now described with reference to FIG. 7.

Figure 7:
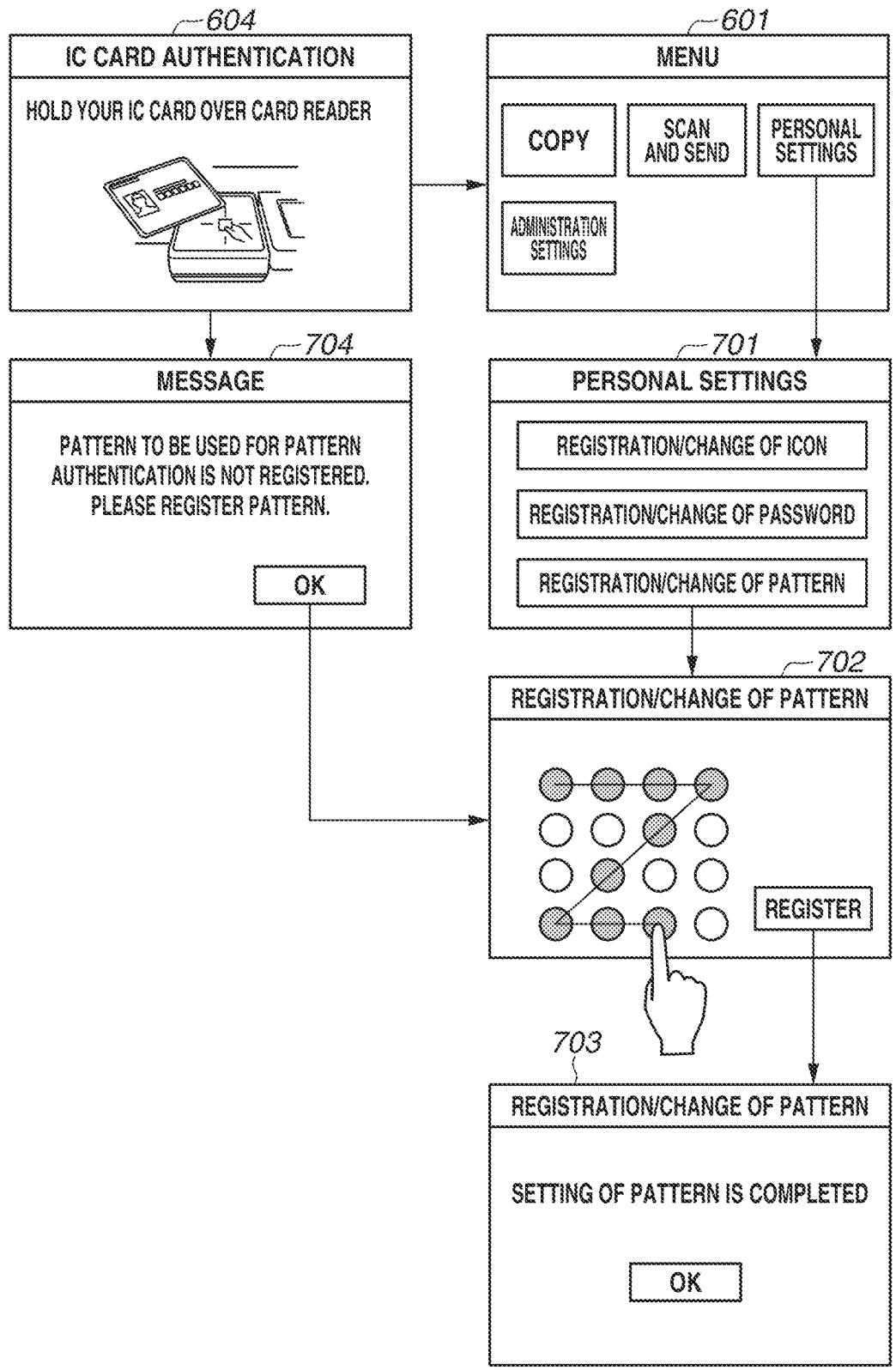
FIG. 7 is a diagram illustrating an operation procedure and screen transition when a pattern is registered.

FIG. 7 illustrates the screen transition in a case where "IC CARD AUTHENTICATION" and "AT TIME OF START OF OPERATION OF MFP" are set in the items 402 and 405, respectively.

<When Setting 404 of Forcing Usage of Pattern Authentication is Disabled>

A description will be given of a pattern registration operation and the screen transition when the setting 404 of forcing usage of the pattern authentication is disabled.

Figure 12:
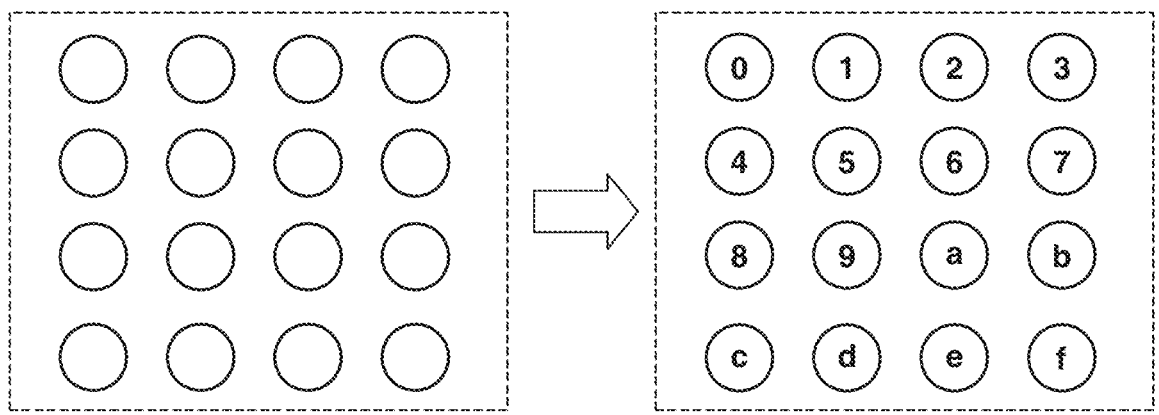
FIG. 12 is a diagram illustrating allocation of values to dots.

In a state where the log-in screen 604 for the IC card authentication is displayed, the user holds his/her IC card over the IC card reader 209 to log in to the MFP 101. When the log-in to the MFP succeeds, the menu screen 601 is displayed. The user who wants to use the pattern authentication selects "PERSONAL SETTINGS" from the menu screen 601 to display a personal setting screen 701. "PERSONAL SETTINGS" provides a registration/change function regarding authentication information of an individual user and a profile. For example, the personal setting screen 701 provides functions regarding "REGISTRATION/CHANGE OF ICON IMAGE" for an avatar, "REGISTRATION/CHANGE OF PASSWORD", "REGISTRATION/CHANGE OF PATTERN", and the like. When the user selects "REGISTRATION/CHANGE OF PATTERN" on the personal setting screen 701, a pattern registration/change screen 702 is displayed. For example, the MFP 101 displays a total of 16 dots in four vertical rows and four horizontal rows on the pattern registration/change screen 702, and causes the user to trace a registered shape with his/her finger in a screen region in which dots are displayed. An appearance of a display object selected by the tracing with the finger changes, and a trajectory of the finger by the tracing is displayed as a line. While the dots are indicated herein as an example of the display object traced by the user with his/her finger, the display object can be in different shape, such as a quadrangle. To prevent erroneous entry of the user, the MFP 101 can ask the user to enter the identical shape multiple times for confirmation of the entry. For example, dots on which the user's finger passes and the passing order is used as pattern information, the pattern information is associated with an account of the log-in user and stored in the user account table (Table 1). As the pattern information, for example, numbers or alphabets can be internally allocated to 4×4 (16) dots as illustrated in FIG. 12.

For example, the illustrated pattern (pattern information) on the pattern registration/change screen 702 can be expressed as "012369cde". The pattern information is encrypted and stored in the user account table (Table 1). Alternatively, the pattern information may be converted to a digest with a hash function and stored. Generally, it is recommended to create the digest using Password-Based Key Derivation Function 2 (PBKDF2). Thus, a salt used for the PBKDF2 and the digest calculated with the PBKDF2 can be stored. When a registration button is pressed and the registration of the pattern information succeeds, a screen 703 indicating completion of the registration is displayed. When the user closes the screen 703, the MFP 101 displays the personal setting screen 701 again.

<When Setting 404 of Forcing Usage of Pattern Authentication is Enabled>

A description will be given of a pattern registration operation and the screen transition of a case where the setting 404 of forcing usage of the pattern authentication is enabled.

In a state where the log-in screen 604 for the IC card authentication is displayed, the user holds his/her IC card over the IC card reader 209 to try log-in to the MFP 101. In a case where the card ID of the IC card is registered in association with the account and the pattern information associated with the account is yet to be registered, the MFP 101 displays a screen 704 showing a message indicating necessity of registration of the pattern, and guides the user to go to the pattern registration/change screen 702. When the registration of the pattern of the user is completed, the MFP 101 displays the screen 703 indicating completion of the registration. When the user closes the screen 703, the user's log-in is completed and the MFP 101 displays the menu screen 601. After display of the pattern registration/change screen 702, the MFP 101 can display the screen of dots again for confirmation of the pattern entered on the pattern registration/change screen 702, and cause the user to enter the pattern identical to the pattern entered on the pattern registration/change screen 702. In a case where the pattern of the user has been registered when the user holds his/her IC card over the IC card reader 209 to try log-in to the MFP 101, the MFP 101 displays a pattern authentication screen.

In a case where "SIMPLE LOG-IN" is selected and enabled in the setting of the item 402, the log-in screen 603 for the simple log-in is displayed instead of the log-in screen 604 for the IC card authentication illustrated in FIG. 7, and the user account is identified by selection of a button instead of being identified with the IC card. The screen displayed after the identification of the user and the operation procedure for the pattern registration are similar between the case of using "IC CARD AUTHENTICATION" and the case of using "SIMPLE LOG-IN".

<Detailed Operations at Time of Pattern Authentication>

Figure 8:
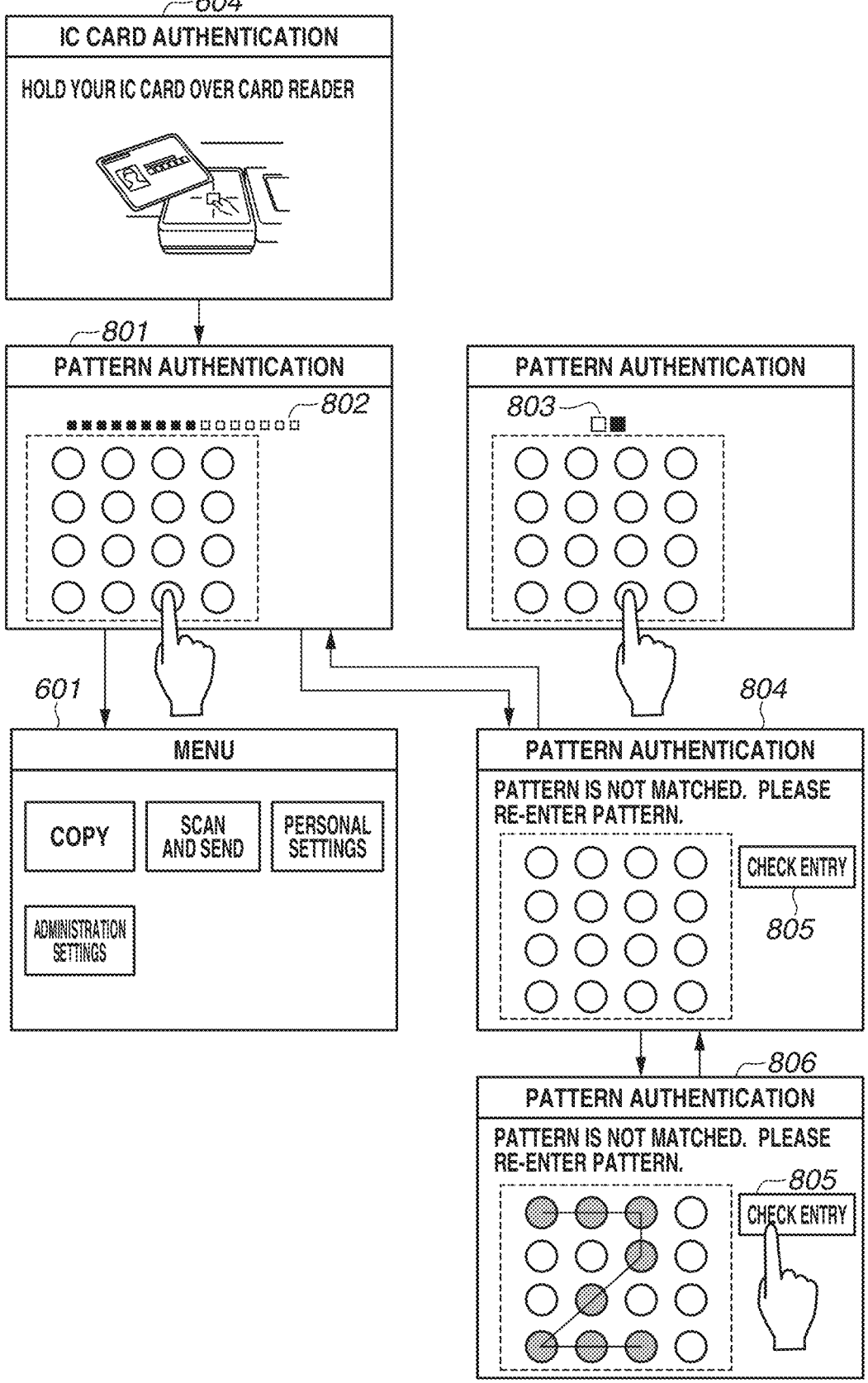
FIG. 8 is a diagram illustrating an operation procedure and screen transition when pattern authentication is used.
Figure 9:
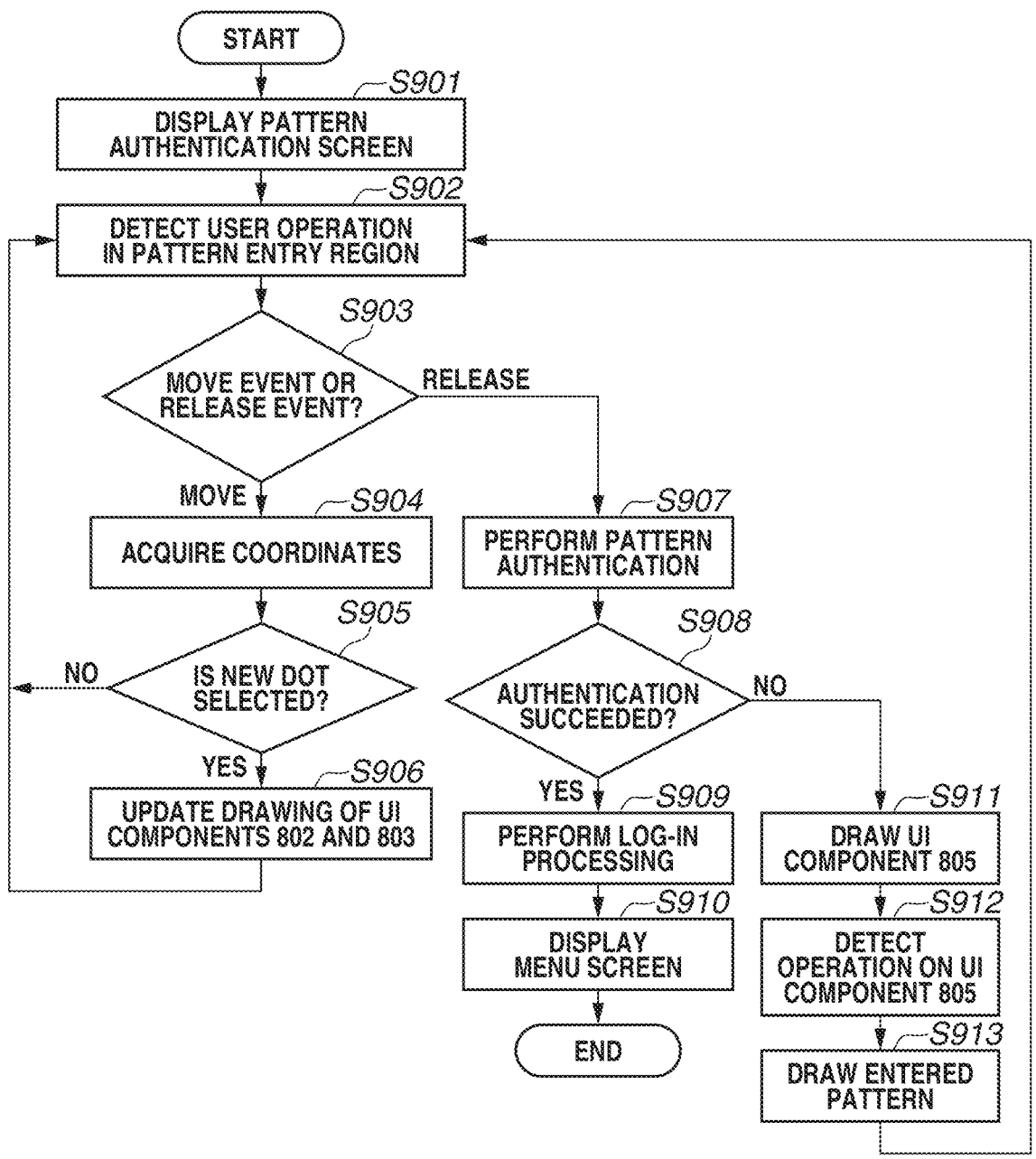
FIG. 9 is a flowchart illustrating an operation during entry of the pattern in the pattern authentication.
Figure 10:
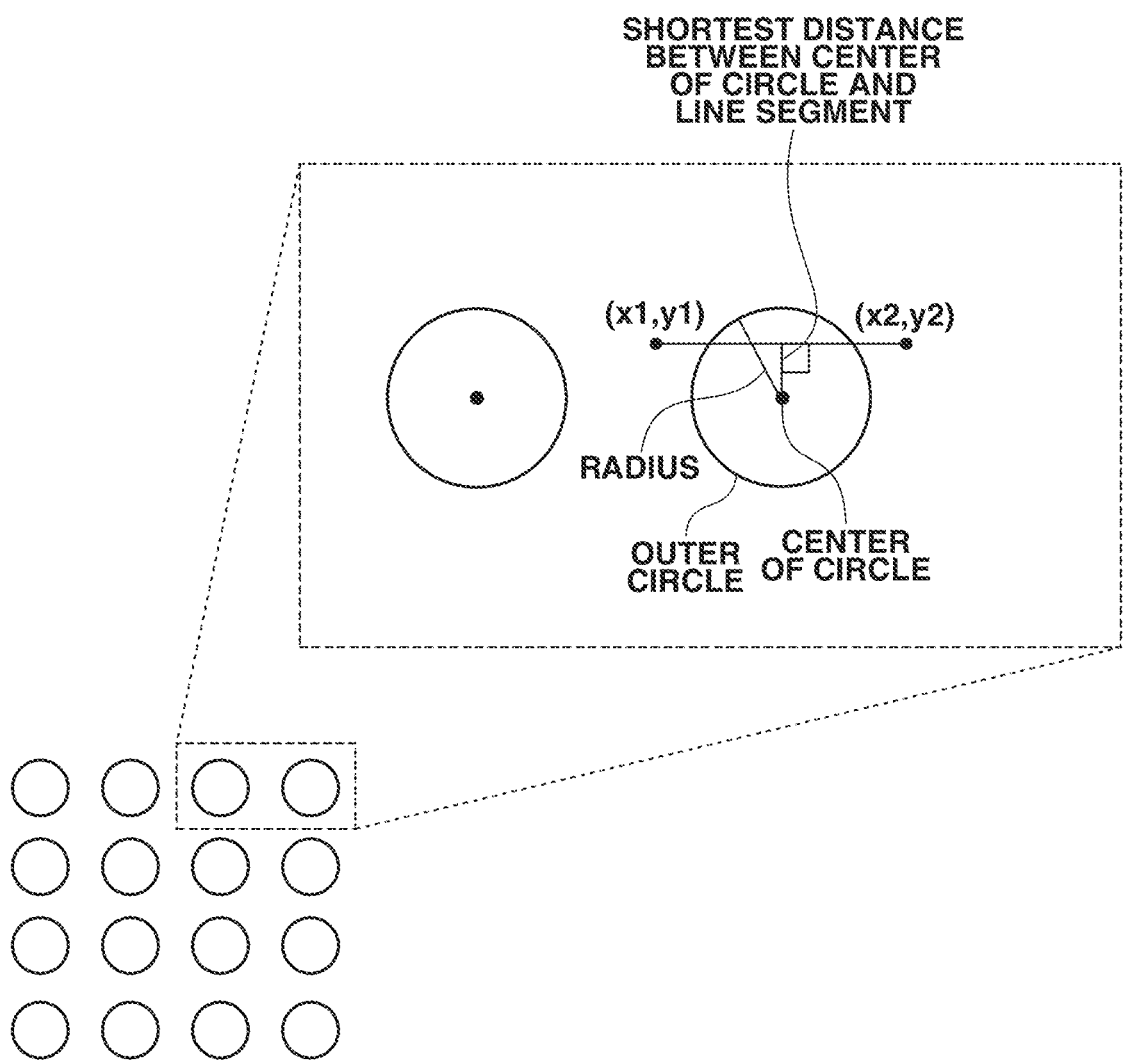
FIG. 10 is a diagram illustrating logic for determining selection of dots.

Subsequently, operations at the time of the pattern authentication are described with reference to FIGS. 8, 9, and 10. FIG. 8 is a diagram illustrating screen transition of a case where the user who has registered the pattern information logs in to the MFP 101 using the card authentication and the pattern authentication. More specifically, FIG. 8 is a screen transition diagram in a case where the IC card authentication and the setting 404 of forcing usage of the pattern authentication are enabled. FIG. 9 is a flowchart describing an operation that is executed by the CPU 201 during entry of the pattern on the pattern authentication screen. FIG. 10 is a diagram illustrating logic for determining whether dots are selected by the user.

In the present exemplary embodiment, a procedure of the flowchart described below are recorded in respective software programs for the local UI 301, the remote UI 302, the log-in service 303, and the IC card reader driver 304. The software programs are stored in a non-volatile storage, such as the ROM 202 and the HDD 204, and is loaded into the RAM 203, and the processing of the flowchart is executed by the CPU 201. The software programs for the local UI 301, the remote UI 302, the log-in service 303, the IC card reader driver 304, and the like provide respective application programming interfaces (APIs), and operate in collaboration with one another by mutually using the APIs. In the description of the operation procedure, a description regarding call of the API is omitted.

In a state where the log-in screen 604 for the IC card authentication is displayed, the user holds his/her IC card over the IC card reader 209 to try log-in to the MFP 101. The log-in service 303 acquires card information (card ID and the like) of the IC card held over the IC card reader 209 through the IC card reader driver 304. The log-in service 303 refers to the user account table (Table 1) to identify the user account associated with the acquired card ID. In a case where the acquired card ID is not registered in the user account table (Table 1) and associated user account does not exist in the user account table, the log-in service 303 displays an error indicating that the card is yet to be registered (not illustrated), on the operation panel. In step S901, in a case where identification of the user account succeeds, the log-in service 303 checks whether the pattern has been registered in the user account table (Table 1), and displays a pattern authentication screen 801. The pattern authentication screen 801 is provided with, in addition to a pattern entry region having 4×4 (16) dots surrounded with a dotted line in the drawings, a UI component 802 or a UI component 803 of which display changes based on the selected number of dots. The user touches the pattern entry region displayed on the operation panel 205 with his/her finger serving as an indicator, moves the finger without releasing the touching from the operation panel 205 (drag operation) to trace the pattern while selecting the dots. During the user operation, to prevent a third person secretly observing the operation panel 205 from guessing the entered pattern based on a drawing on the operation panel 205, the log-in service 303 neither changes the appearances of dots nor draws a line between dots or a trajectory. While the example mentioned herein is an example of neither changing the appearances of dots nor drawing the line between the dots or the trajectory to prevent a third person from guessing the pattern, a configuration of not performing either of the changing and the drawing can also be employed. Alternatively, the changing in the appearances of the dots and the drawing of the line between the dots or the trajectory can be displayed for the user but in a narrowly recognizable manner. The shape of the pattern is the trajectory (figure) traced by the user with his/her finger.

If the appearances of the dots selected by the user operation is not changed or the line between the dots is not drawn, the user is unable to visually recognize his/her own operation. That is, if no response to the user operation is made on the screen, the user cannot check his/her own operation, which may arouse suspicion of a failure or the like of the MFP 101. Thus, in the present exemplary embodiment, the log-in service 303 changes drawing of the UI component 802 or the UI component 803 to respond to the user's entry of the pattern. Specifically, the UI component 802 is a progress bar indicating progress of the entry of the pattern. In a case where the maximum number of dots in a registerable pattern is 16, the progress bar is provided with a scale of 16 points, and the log-in service 303 updates, when determining that a new dot is selected during the user's entry of the pattern, display such that the scale of the UI component 802 is incremented by one. For example, in a process in which the user selects dots expressed as "012369cde", the log-in service 303 changes the drawing of the UI component 802 as indicated by the following Table 3.

TABLE 3

| Selected dot | Display of UI component 802 |
|---|---|
| Not selected | ☐☐☐☐☐☐☐☐☐☐☐☐☐☐☐☐ |
| 0 | ■☐☐☐☐☐☐☐☐☐☐☐☐☐☐☐ |
| 01 | ■■☐☐☐☐☐☐☐☐☐☐☐☐☐☐ |
| 012 | ■■■☐☐☐☐☐☐☐☐☐☐☐☐☐ |
| 0123 | ■■■■☐☐☐☐☐☐☐☐☐☐☐☐ |
| 01236 | ■■■■■☐☐☐☐☐☐☐☐☐☐☐ |
| 012369 | ■■■■■■☐☐☐☐☐☐☐☐☐☐ |
| 012369c | ■■■■■■■☐☐☐☐☐☐☐☐☐ |
| 012369cd | ■■■■■■■■☐☐☐☐☐☐☐☐ |
| 012369cde | ■■■■■■■■■☐☐☐☐☐☐☐ |

The log-in service 303 can customize, in accordance with the pattern set by each user, the display such that a scale numbering of the progress bar is identical to the number of dots of the pattern set by the user. For example, in a case where the set pattern is "012369cde", the scale numbering of the progress bar is set to be nine. Accordingly, when the display of the progress bar indicates 100%, the user can understand that the entry is completed.

Furthermore, when a new dot is selected by the user operation, the log-in service 303 can refer to the pattern corresponding to the user and perform control to update the scale of the progress bar in a case where the selected dot is a correct dot, and not to update the scale of the progress bar in a case where the selected dot is an incorrect dot. This allows the user to understand whether the user has selected an incorrect dot.

A drawing update operation for the above-mentioned UI components is now described with reference to the flowchart in FIG. 9 and FIG. 10. In step S902, after displaying the pattern authentication screen 801 in step S901, the log-in service 303 waits for the user operation in the pattern entry region and detects the user operation. In step S903, the log-in service 303 determines a type of the detected operation. Main types of the operation are a "move event indicating that a contact position of the user's finger on the operation panel 205 is changed when the finger touches the operation panel 205 and every time the finger slides in a touched state" and a "release event indicating that the finger is released from the operation panel 205". In a case where the move event is detected (MOVE in step S903), the processing proceeds to step S904. In step S904, the log-in service 303 acquires coordinates (x2, y2) of the current contact position of the finger on the operation panel 205 from the move event and stores the coordinates.

Subsequently, in step S905, the log-in service 303 determines whether a new dot is selected by sliding of the finger. The log-in service 303 cannot acquire all coordinate positions of portions touched by the user's finger from the operation panel 205, which, however, depends on capability of the operation panel 205, and can acquire part of the coordinate positions. Thus, for example, in a case where the log-in service 303 has coordinates (x1, y1) acquired in the previous move event, the log-in service 303 determines that the finger has passed a line segment connecting the coordinates (x1, y1) and the coordinates (x2, y2). The log-in service 303 calculates a distance between the line segment linearly connect the coordinates (x1, y1) and the coordinates (x2, y2) and central coordinates of a circle of each dot. In a case where the obtained distance is smaller than a radius of the dot, the log-in service 303 determines that the line segment passes through an outer circle of the dot, and can determine that the dot is selected. In a case where there is no outer circle of a dot through which the line segment passes or in a case where a dot selected the last time and a dot currently selected are the same, the log-in service 303 determines that no new dot is selected (NO in step S906), and ends move event processing. The processing then returns to step S902, and the log-in service 303 waits until occurrence of the next move event or the release event.

In a case where the log-in service 303 determines that the new dot is selected (YES in step S905), the processing proceeds to step S906. In step S906, the log-in service 303 replaces the newly selected dot with number or alphabet information and stores the newly selected dot together with an already selected dot(s), and further updates the drawing of the UI component 802 in accordance with the number of the selected dots as indicated in Table 3.

Then, the processing returns to step S902, and the log-in service 303 waits until occurrence of the next move event or the release event. As described above, the log-in service 303 can refer to the pattern corresponding to the user when determining that the new dot is selected, and update the drawing of the UI component 802 in step S906 in a case where a correct dot is selected. In a case where a correct dot is not selected, the log-in service 303 may not update the drawing of the UI component 802, or may display an error screen.

The UI component 802 is an example of a UI component that indicates a response to the user's entry of the pattern, and can be a different UI component that can indicate a UI response to the entry of the pattern. As an example of a different UI component, the UI component 803 is described as an example. The UI component 803 is a component having a bilaterally asymmetric appearance, and drawing of the UI component 803 is reversed between display in a case where the number of selected dots is an even number (including zero) and display in a case where the number of selected dots is an odd number. This configuration helps the user understand that a selection operation progresses because the appearance of the UI component changes every time the user selects a new dot. Since the total number of selected dots is not known to other users from the drawing of the UI component 802, this configuration provides safety. For example, in a process in which the user selects dots expressed as "012369cde", the log-in service 303 changes drawing of the UI component 803 as indicated by the following Table 4.

TABLE 4

| Selected dot | Display of UI component 803 |
| --- | --- |
| Not selected | ■□ |
| 0 | □■ |
| 01 | ■□ |
| 012 | □■ |
| 0123 | ■□ |
| 01236 | □■ |
| 012369 | ■□ |
| 012369c | □■ |

TABLE 4-continued

| Selected dot | Display of UI component 803 |
| --- | --- |
| 012369cd | ■□ |
| 012369cde | □■ |

A mode of the UI component that indicates a response to the user's entry of the pattern is not limited thereto, and a different mode can be used. For example, the log-in service 303 may display a total number of selected dots, and display a countdown of the displayed number every time the user selects a dot. That is, a display mode may be any mode that prevents a third person from identifying the pattern even in a case where a third person secretly observes the user's entry of the pattern.

The log-in service 303 can perform control of hardware such as lighting of a light emitting diode (LED) and vibration, instead of using the UI component, to notify the user of selection of the new dot or completion of the entry of the pattern.

Subsequently, a description will be given of the operation procedure executed by the CPU 201 after the entry of the pattern with reference to the screen transition illustrated in FIG. 8 and the flowchart described in FIG. 9. In a case where the user enters the pattern on the pattern authentication screen 801 and releases his/her finger from the pattern entry region, the log-in service 303 is notified of the release event (RELEASE in step S903), and then the processing proceeds to step S907. In step S907, the log-in service 303 that has detected the occurrence of the release event in step S903 refers to the user account table (Table 1), and compares the user's preliminarily registered pattern that is identified by the IC card authentication and the pattern entered on the pattern authentication screen 801 to perform the pattern authentication. In step S908, the log-in service 303 determines whether the patterns are matched with each other. In a case where the patterns are matched with each other, the log-in service 303 determines that the authentication succeeds (YES in step S908), and then the processing proceeds to step S909. In step S909, the log-in service 303 performs processing for the user successfully authenticated to log in to the MFP 101. Specifically, the log-in service 303 loads information of the user successfully authenticated from the user account table (Table 1) into the RAM 203, and instantiates a structure in which the information of the log-in user is stored (hereinafter referred to as a log-in context). The information to be stored in the log-in context is the user name, the role, the e-mail address, and the like as indicated in Table 5.

TABLE 5

| Item | Value |
| --- | --- |
| User name | Alice |
| Role | Administrator |
| E-mail address | alice@xxxxx.com |

The log-in service 303 notifies the local UI 301 of the log-in of the user to the MFP 101, together with the log-in context. In step S910, the local UI 301 displays the menu screen 601. In a case where the preliminarily registered pattern and the entered pattern are not matched with each other, the log-in service 303 determines that the authentication fails (NO in step S908), and the processing proceeds to step S911. In step S911, the log-in service 303 updates the screen to display a drawing of a pattern authentication screen 804 and displays a UI component 805. The UI component 805 is a button for the user to check the shape of the pattern entered immediately before. In step S912, the log-in service 303 detects that the user has operated the UI component 805. In step S913, the log-in service 303 indicates the shape of the pattern entered by the user by changing the appearance of the selected dots or drawing the line between the dots or the trajectory. For example, when the button serving as the UI component 805 is pressed, the log-in service 303 indicates the shape of the pattern entered by the user as illustrated in a screen 806 by changing the appearances of the selected dots or drawing the line between the dots or the trajectory. When detecting that the user has touched the pattern entry region with his/her finger during display of the drawing of the screen 804 or 806, the log-in service 303 stops display of the drawing of the UI component 805 or the drawing of the shape of the pattern entered by the user, restores the display state to the pattern authentication screen 801, and performs the move event processing or the release event processing again.

Alternatively, in a case where the authentication fails in the pattern authentication, the log-in service 303 can automatically display the pattern entered on the operation panel 205 during a predetermined period of time (for example, two seconds), instead of displaying the UI component 805 to prompt the user to press the button for display of the UI component 805. Yet alternatively, the log-in service 303 can display the entered pattern during a predetermined button (for example, the UI component 805) is touched. In this manner, in a case where the pattern authentication fails, displaying the entered pattern helps the user notice an operation error or the like.

While the example of using "IC CARD AUTHENTICATION" has been described with reference to FIG. 8, an operation after display of the pattern authentication screen 801 is similar also in a case where "SIMPLE LOG-IN" and the pattern authentication are used in combination. In a case where "SIMPLE LOG-IN" and the pattern authentication are used in combination, the user's account to be used for the pattern authentication is identified by the user's pressing of a button on the log-in screen 603 for the simple log-in, instead of using the IC card.

<Effect of First Exemplary Embodiment>

As described above, when the user enters the pattern, the pattern is not drawn on the UI in such a manner as that the shape of the pattern is recognizable by the user. The description has been given of the exemplary embodiment of providing the means of checking the entered pattern in the case where the entered pattern is incorrect.

The above-mentioned configuration enables secure log-in to the MFP without causing the shape of the pattern or the like to be seen by a third person secretly observing the operation panel. Providing the UI component that performs a UI response to the entry of the pattern allows the user to check his/her own operation. The configuration allows the user who has made an error in entry of the pattern to understand whether his/her memory of the pattern is incorrect, or whether he/she has entered a different pattern by an operation error although his/her memory of the pattern is correct.

While the example of drawing the shape of the pattern at the time of registration of the pattern has been described in the present exemplary embodiment, the MFP can also include a UI component, for use in the time of registration of the pattern, that indicates the entry status of the pattern without drawing the shape of the pattern, like the pattern authentication screen. This configuration realizes the MFP having such secure pattern authentication as that does not display the correct shape of the pattern.

While the example of displaying the display objects, such as dots, to enter the pattern has been described in the present exemplary embodiment, the MFP can be configured not to display the display objects. More specifically, the MFP can be configured to receive entry of the pattern in a region in which nothing is displayed. Also in this case, the MFP does not display the shape of the entered pattern in a manner recognizable by the user. Further, the MFP displays the progress bar or the like indicating progress of the entry of the pattern.

In the first exemplary embodiment, the configuration guaranteeing confidentiality by not drawing the shape of the pattern entered at the time of the pattern authentication has been described. Other than the pattern authentication, login information or the like is entered using, for example, a software keyboard, and if touch animation of keys touched by the user is displayed, entry of the login information can be secretly observed by a third person and obtained by guessing. In a second exemplary embodiment, a description will be given of an example in which touch animation of a software keyboard is not displayed when confidential information is entered.

The touch animation mentioned herein is display in which a touched key is differentiated from the other keys to help the user recognize the touched key. Since a basic configuration of the present exemplary embodiment is similar to that of the first exemplary embodiment, the redundant description is omitted and a difference will be described.

Figure 11:
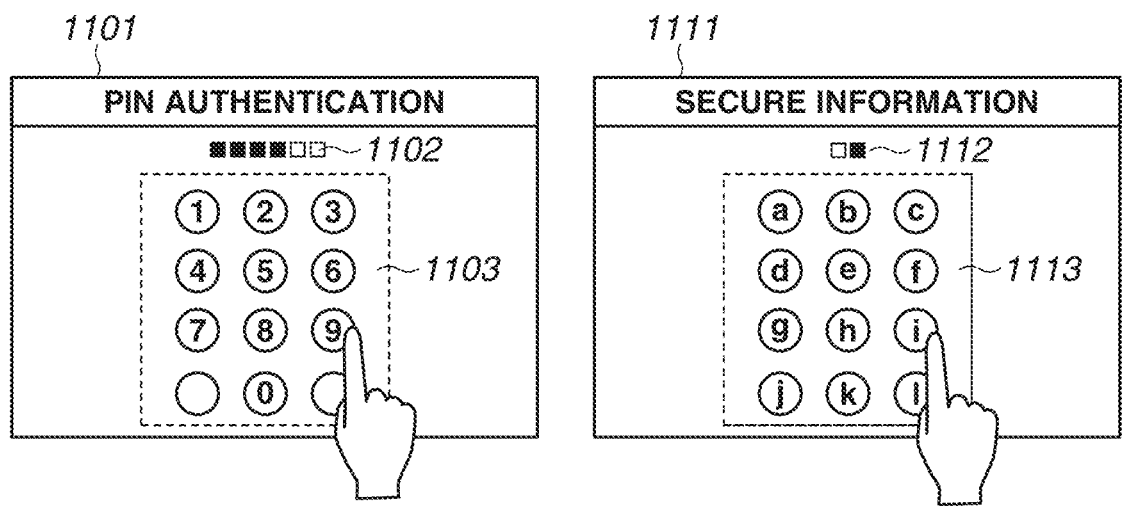
FIG. 11 is a diagram illustrating screens for entry of secure information according to a second exemplary embodiment.

FIG. 11 is a diagram illustrating an example of an entry screen for secure information according to the present exemplary embodiment.

A screen 1101 is a screen for entry of authentication information, and includes a software keyboard 1103 for entry of the authentication information, and a UI component 1102 which changes display based on the number of touched keys. The software keyboard 1103 does not display the touch animation of keys even in a case where the software keyboard 1103 receives the user's touch operation. Instead, display of the UI component 1102 is updated every time the user touches and selects a key of the software keyboard 1103. The UI component 1102 is subjected to display control that is similar to the display control of the UI component 802 according to the first exemplary embodiment.

A screen 1111 is a screen for entry of the secure information, and includes a software keyboard 1113 for entry of the secure information, and a UI component 1112 which changes display based on the number of touched keys. The software keyboard 1113 does not display the touch animation of keys even in a case where the software keyboard 1113 receives the user's touch operation. Instead, display of the UI component 1112 is updated every time the user touches and selects a key of the software keyboard 1113. The UI component 1112 is subjected to display control that is identical to the display control of the UI component 803 according to the first exemplary embodiment.

The present exemplary embodiment can guarantee confidentiality even in a case where the secure information is entered with the software keyboard, and enhances operability because the user can visually recognize a response to his/her own operation.

While the example of entry of the authentication information has been described in the above-mentioned exemplary embodiments, the information to be entered can be any information requiring secure handling.

The above-mentioned exemplary embodiments enable entry of authentication information while confidentiality is guaranteed without decreasing the user's operability.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-172316, filed Oct. 21, 2021, which is hereby incorporated by reference herein in its entirety.

What is claimed is:

1. An information processing apparatus including an operation panel, the information processing apparatus comprising:
one or more processors; and
at least one memory storing executable instructions, which, when executed by the one or more processors, cause the information processing apparatus to perform operations comprising:
receiving, in user authentication of the information processing apparatus, a setting of using keyboard authentication and card authentication and simple log-in;
performing, in a case where a setting to force use of the pattern authentication in addition to the card authentication is made by a user, after the card authentication is successful, display control of displaying, on the operation panel, a plurality of first display objects to receive authentication information required for the pattern authentication, wherein the plurality of first display objects are objects different from a plurality of second display objects for receiving authentication information required for the keyboard authentication, and wherein the plurality of first display objects are dots;
performing, at a time of logging in based on the simple log-in, in a case where the setting to force the use of the pattern authentication is made by the user, processing to identify a user account that is to be used in the pattern authentication in response to pressing a user button; and
receiving the authentication information, based on first display objects selected from among the plurality of first display objects by an operation of an indicator that touches on the operation panel and moves while maintaining a touching state on the operation panel,
wherein, in the display control, in a case where the operation is received, display indicating receipt of the operation without performing display indicating selection performed on the plurality of first display objects, and
wherein, after the pattern authentication using the authentication information required for the pattern authentication received in the receiving is successful, a function of the information processing apparatus is provided to the user.

2. The information processing apparatus according to claim 1, the operations further comprising causing a user to log in to the information processing apparatus, based on the authentication information received in the receiving.

3. The information processing apparatus according to claim 1, wherein, in a case where the operation is received, performing the display control includes not to change an appearance of the selected first display objects.

4. The information processing apparatus according to claim 1, wherein performing the display control includes not to display a line indicating a trajectory of the indicator moved in the operation.

5. The information processing apparatus according to claim 1, wherein, in a case where the operation is received, performing the display control includes displaying a third display object in which display is changed every time any of the plurality of first display objects is selected by the operation.

6. The information processing apparatus according to claim 5, wherein the third display object is a progress bar.

7. The information processing apparatus according to claim 5, wherein, in a case where the selected first display object is correct, performing the display control includes changing the display of the third display object, and in a case where the selected first display object is incorrect, performing the display control includes not to change the display of the third display object.

8. The information processing apparatus according to claim 1, wherein, in a case where the operation is received, performing the display control includes performing display on which a user checks the number of the first display objects selected by the operation.

9. The information processing apparatus according to claim 1,
wherein the information processing apparatus is configured to execute the pattern authentication, and
wherein the receiving comprises receiving a pattern based on the operation.

10. The information processing apparatus according to claim 9, wherein, in a case where the operation is received, performing the display control includes not to display a shape of the pattern.

11. The information processing apparatus according to claim 9, wherein, in a case where the authentication information received in the receiving is different from registered authentication information, performing the display control includes performing display on which a shape of the pattern based on the operation is recognizable by the user.

12. The information processing apparatus according to claim 1, wherein, in a case where a predetermined operation is received from a user, performing the display control includes performing display on which the first display objects selected by the operation are recognizable by the user.

13. The information processing apparatus according to claim 1, wherein, in a case where the authentication information received in the receiving is different from registered authentication information, performing the display control includes performing display on which the first display objects selected by the operation are recognizable by the user.

14. The information processing apparatus according to claim 1, wherein the operation is a drag operation of tracing the plurality of first display objects.

15. The information processing apparatus according to claim 1, wherein, after the card authentication is successful, in a case where a pattern of the user is not registered, the plurality of first display objects is displayed, the pattern of the user is registered using the plurality of first display objects, and the function of the information processing apparatus is provided to the user.

16. A control method executed by an information processing apparatus including an operation panel, the control method comprising:
   receiving, in user authentication of the information processing apparatus, a setting of using keyboard authentication and card authentication and simple log-in;
   performing, in a case where a setting to force use of the pattern authentication in addition to the card authentication is made by a user, after the card authentication is successful, display control of displaying, on the operation panel, a plurality of first display objects to receive authentication information required for the pattern authentication, wherein the plurality of first display objects are objects different from a plurality of second display objects for receiving authentication information required for the keyboard authentication, and wherein the plurality of first display objects are dots;
   performing, at a time of logging in based on the simple log-in, in a case where the setting to force the use of the pattern authentication is made by the user, processing to identify a user account that is to be used in the pattern authentication in response to pressing a user button; and
   receiving the authentication information, based on first display objects selected from among the plurality of first display objects by an operation of an indicator that touches on the operation panel and moves while maintaining a touching state on the operation panel,
   wherein, in the display control, in a case where the operation is received, display indicating receipt of the operation without performing display indicating selection performed on the plurality of first display objects, and
   wherein, after the pattern authentication using the authentication information required for the pattern authentication received in the receiving is successful, a function of the information processing apparatus is provided to the user.

17. The control method according to claim 16, wherein, after the card authentication is successful, in a case where a pattern of the user is not registered, the plurality of first display objects is displayed, the pattern of the user is registered using the plurality of first display objects, and the function of the information processing apparatus is provided to the user.

18. A non-transitory computer-readable storage medium storing one or more programs including instructions, which when executed by one or more processors of an information processing apparatus, cause the information processing apparatus to perform operations comprising:
   receiving, in user authentication of the information processing apparatus, a setting of using keyboard authentication and card authentication and simple log-in;
   performing, in a case where a setting to force use of the pattern authentication in addition to the card authentication is made by a user, after the card authentication is successful, display control of displaying, on the operation panel, a plurality of first display objects to receive authentication information required for the pattern authentication, wherein the plurality of first display objects are objects different from a plurality of second display objects for receiving authentication information required for the keyboard authentication, and wherein the plurality of first display objects are dots;
   performing, at a time of logging in based on the simple log-in, in a case where the setting to force the use of the pattern authentication is made by the user, processing to identify a user account that is to be used in the pattern authentication in response to pressing a user button; and
   receiving the authentication information, based on first display objects selected from among the plurality of first display objects by an operation of an indicator that touches on the operation panel and moves while maintaining a touching state on the operation panel,
   wherein, in the display control, in a case where the operation is received, display indicating receipt of the operation without performing display indicating selection performed on the plurality of first display objects, and
   wherein, after the pattern authentication using the authentication information required for the pattern authentication received in the receiving is successful, a function of the information processing apparatus is provided to the user.

19. The non-transitory computer-readable storage medium according to claim 18, wherein, after the card authentication is successful, in a case where a pattern of the user is not registered, the plurality of first display objects is displayed, the pattern of the user is registered using the plurality of first display objects, and the function of the information processing apparatus is provided to the user.

* * * * *